US012733085B2

(12) United States Patent
Schmücker et al.

(10) Patent No.: US 12,733,085 B2
(45) Date of Patent: Sep. 8, 2026

(54) DETERMINATION OF X-RAY TUBE CURRENT

(71) Applicant: KONINKLIJKE PHILIPS N.V., Eindhoven (NL)

(72) Inventors: Helmut Gerhard Schmücker, Hamburg (DE); Arnfinn Richard Christian Hylla, Regesbostel (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 19/135,408

(22) PCT Filed: Dec. 11, 2023

(86) PCT No.: PCT/EP2023/085045
§ 371 (c)(1),
(2) Date: Jun. 4, 2025

(87) PCT Pub. No.: WO2024/126335
PCT Pub. Date: Jun. 20, 2024

(65) Prior Publication Data

US 2026/0013025 A1 Jan. 8, 2026

(30) Foreign Application Priority Data

Dec. 15, 2022 (EP) .................................... 22213678

(51) Int. Cl.
*H05G 1/26* (2006.01)
*H05G 1/34* (2006.01)
*H05G 1/52* (2006.01)

(52) U.S. Cl.
CPC ............... *H05G 1/265* (2013.01); *H05G 1/34* (2013.01); *H05G 1/52* (2013.01)

(58) Field of Classification Search
CPC ............ H05G 1/265; H05G 1/34; H05G 1/52; H05G 1/58; H05G 2/00; H05G 1/20;
(Continued)

(56) References Cited

U.S. PATENT DOCUMENTS 5,077,773 A 12/1991 Sammon
7,844,030 B2 11/2010 Wilson
(Continued)

FOREIGN PATENT DOCUMENTS

CN 101569533 A 11/2009
CN 104470175 A 3/2015
(Continued)

OTHER PUBLICATIONS

Li B. et al., "Head and Body CTDIW of Dual-Energy X-Ray CT with Fast-kVp Switching", Medical Imaging, Physics of Medical Imaging, Proc. of SPIE, vol. 7622, 76221Y, 2010.
Chen W-G et al., "Research on X-ray Tube Current Control Methods", Nuclear Electronics & Detection Technology, vol. 28, No. 4, pp. 770-773, Jul. 2008.
PCT International Search Report, International application No. PCT/EP2023/085045, Mar. 12, 2024.
(Continued)

*Primary Examiner* — Irakli Kiknadze
(74) *Attorney, Agent, or Firm* — Larry Liberchuk

(57) ABSTRACT

The invention relates to a computer-implemented method of determining a tube current during X-ray kVp switching. The method includes generating (110) a calibration tube voltage pulse during a calibration phase, wherein the calibration tube voltage pulse comprises a first kVp plateau and a second kVp plateau different from the first kVp plateau; measuring (120), during the calibration tube voltage pulse, a first tube current at the first kVp plateau and a second tube current at the second kVp plateau; determining (130) a calibration factor from a ratio between the first tube current and the second tube current; measuring (140) a third tube current at a steady state of the first kVp plateau during a kVp switching phase; and determining (150) a fourth tube current at the second kVp plateau during the kVp switching phase,
(Continued)

wherein the fourth tube current is determined based on the calibration factor and the third tube current at the first kVp plateau. The invention also relates to a high voltage generator (30) configured to carry out the computer implemented method, a computer program element and a computer readable medium, and an X-ray system.

8 Claims, 6 Drawing Sheets

(58) Field of Classification Search
CPC ... H05G 1/30; H05G 1/46; A61B 6/40; A61B 6/582; A61B 6/032; A61B 6/482; A61B 6/5205; A61B 6/54; A61B 6/545; A61B 6/405; A61B 6/42; A61B 6/5211; A61B 6/583; A61B 6/4021; A61B 6/4435; A61B 6/03; A61B 6/0407; A61B 6/483; A61B 6/461; A61B 6/06; A61B 6/4042; A61B 6/4208; A61B 6/4241; A61B 6/4233; A61B 6/4085; A61B 6/4035; A61B 6/58; A61B 6/5258; G01V 5/22; H05H 7/02; H05H 9/048; H05H 9/02; H05H 2007/022; H05H 2007/025; H05H 2277/11; H01J 35/04; H01J 35/147; H01J 35/153; G01N 23/046; G01N 2223/1016; G01N 2223/303; G01N 2223/03; G01N 2223/404; G06T 12/10; G06T 7/0012; A61K 49/0438
USPC .................................................... 378/62, 145
See application file for complete search history.

(56) References Cited

U.S. PATENT DOCUMENTS

| | | | | |
|---|---|---|---|---|
| 9,265,135 | B2 | 2/2016 | Auernhammer | |
| 9,324,142 | B2 | 4/2016 | Shechter | |
| 10,182,775 | B2 | 1/2019 | Nakai | |
| 11,000,248 | B2 | 5/2021 | Gadenne | |
| 11,963,284 | B2 | 4/2024 | Daeer | |
| 2005/0084070 | A1 | 4/2005 | Chretien | |
| 2013/0003914 | A1 * | 1/2013 | Yin | A61B 6/542 378/16 |
| 2018/0064410 | A1 | 3/2018 | Li | |
| 2022/0061143 | A1 | 2/2022 | Nighan | |
| 2023/0293135 | A1 * | 9/2023 | Maltz | A61B 6/56 |

FOREIGN PATENT DOCUMENTS

| | | | |
|---|---|---|---|
| CN | 106851951 | A | 6/2017 |
| CN | 108956658 | A | 12/2018 |
| CN | 111050455 | A | 4/2020 |
| EP | 3967233 | A1 | 3/2022 |
| JP | H09161990 | A | 6/1997 |
| KR | 20140118539 | A | 10/2014 |

OTHER PUBLICATIONS

Muller K. et al., "Interventional Dual-Energy Imaging-Feasibility of Rapid kV-Switching on a C-arm CT System", Medical Physics, AIP, Melville, NY, US, vol. 43, No. 10, Sep. 20, 2016, pp. 5537-5546, XP012212082.

* cited by examiner

DETERMINATION OF X-RAY TUBE CURRENT

FIELD OF THE INVENTION

The invention relates to a computer-implemented method of determining a tube current during X-ray kVp switching. The invention further relates to a high voltage generator configured to carry out the computer implemented method. The invention further relates to a computer program element and a computer readable medium. The invention further relates to an X-ray system.

BACKGROUND OF THE INVENTION

A computed tomography (CT) scanner generally includes an X-ray tube mounted on a rotatable gantry opposite one or more rows of detectors. The X-ray tube rotates around an examination region located between the X-ray tube and the one or more rows of detectors and emits broadband radiation that traverses the examination region. Electrical power is supplied to the X-ray tube with a high voltage generator.

The one or more rows of detectors detect radiation that traverses the examination region and generate projection data indicative thereof. A reconstructor reconstructs the projection data to generate volumetric image data, which can be displayed, filmed, archived, conveyed to another device, etc.

The detector array includes detector pixels that convert detected x-ray photons into electrical signals indicative thereof. For each revolution of the rotating gantry, the detector pixels detect and convert x-ray photons for a plurality of integration periods, each corresponding to a different angular position range. The time duration of an integration period depends on the rotating gantry rotation speed and the number integration periods for each revolution of the scan. With an integrating detector array, at the beginning of each integration period, the integrators for the detector pixels are reset, and then the integrators receive and integrate the electrical signals over the integration period. The integrated signals form the projection data for that integration period.

The X-ray tube typically includes a cathode with a filament and an anode. A filament current is applied to the filament, which current heats the filament, causing the filament to expel electrons (thermionic emission), creating a space charge (or cloud a negative charge) a short distance away from the filament. A peak tube voltage (kilovoltage peak kVp) is applied across the cathode and the anode and causes a beam of the electrons to accelerate from the cathode and impinge the anode. The X-ray tube current, or emission current, represents the number of electrons per second flowing from the cathode to the anode. Electrostatic or magnetic focusing with e.g. grid electrodes or quadrupoles can be applied to control a size of and steer the beam of electrons. An interaction of the electrons with the material of the anode produces heat and radiation, including X-rays, which pass through a tube window, into an examination region, to a detector.

A surface area of the anode that receives the beam of electrons is referred to as a focal spot. The size of the focal spot is one factor that affects the image quality of the volumetric image data. For example, the focal spot size affects the spatial resolution, where a smaller focal spot size results in a greater spatial resolution than a larger focal spot size, e.g., due to less focal spot blur from geometric magnification. The size and/or position of the focal spot may depend on the X-ray tube voltage, beam focusing voltage and tube current.

The voxels of the volumetric image data are displayed using gray scale values corresponding to relative radiodensity. The gray scale values reflect the attenuation characteristics of the scanned subject and represent anatomical structures. The detected radiation also includes spectral information as the absorption of a photon by a material of a subject and/or an object is dependent on the energy of the photon traversing the material. Such spectral information provides additional information such as information indicative of the atomic, elemental or material composition of the material. However, the projection data does not reflect the spectral characteristics as the projection data are proportional to the energy fluence integrated over the energy spectrum (e.g., 40 keV to 120 keV), and the volumetric image data will not reflect the energy dependent information.

A CT scanner configured for spectral (multi/dual-energy) imaging leverages the spectral characteristics in the detected radiation to provide further information such as atomic or elemental composition information. In general, a spectral CT scanner is configured to detect different bands of X-ray radiation (instead of just the entire spectrum) and generate projection data for each of the different energy bands (instead of just the entire spectrum). In one instance, this is achieved through so-called kVp switching. For example, with a dual-energy configuration, the X-ray tube voltage (i.e. the kVp) may be switched back and forth between two kVp's, such as between a first 80 kVp for odd number data acquisition periods and a second 140 kVp for even number data acquisition periods, or vice versa. The X-ray spectrum generated at low energy (such as but not limited to 80 kVp) is different compared to the X-ray spectrum generated at high energy (such as but not limited to 140 kVp).

Spectral imaging using fast kVp switching in the high voltage generator may be a promising cost-effective alternative to e.g. spectral imaging with multi-layer energy discriminating scintillator or direct conversion detectors.

The publication MULLER KET AL: "Interventional dual-energy imaging-Feasibility of rapid kV-switching on a C-arm CT system", MEDICAL PHYSICS, AIP, MELVILLE, NY, US, vol. 43, no. 10, 20 Sep. 2016 (2016 Sep. 20), explores the feasibility of implementing a fast ky-switching technique on a clinically available angiographic system for acquiring dual-energy C-arm CT images.

During fast kVp switching, the tube voltage and the tube current changes very quickly, sometimes in the order of tenths to hundreds of microseconds. In addition, emission current characteristics of the system may change over time, in between as well as during imaging sessions, due to effects such as component aging, system temperature, filament cooling etc. In order to optimally control tube and/or generator parameters during fast kVp switching spectral imaging, it is important to be able to react on instant variations in X-ray tube emission current, such as directly after a tube voltage transition. However, during such a fast-switching kVp cycle it may be very challenging or even impossible to provide an emission current measurement that is both timely and sufficiently accurate. Hence, there is a need to solve this problem.

SUMMARY OF THE INVENTION

It is an object of the invention to provide improved determination of an X-ray tube emission current during fast kVp switching.

The invention is defined by the independent claims. Advantageous embodiments are defined in the dependent claims.

According to a first aspect of the invention, there is provided a computer-implemented method of determining a tube current during X-ray kVp switching. The method comprises

- generating a calibration tube voltage pulse during a calibration phase, wherein the calibration tube voltage pulse comprises a first kVp plateau and a second kVp plateau, wherein the second kVp plateau is at a different kVp level compared to the first kVp plateau;
- measuring, during the calibration tube voltage pulse, a first tube current at the first kVp plateau and a second tube current at the second kVp plateau;
- determining a calibration factor from a ratio between the first tube current and the second tube current;
- measuring a third tube current at a steady state of the first kVp plateau during a kVp switching phase; and
- determining a fourth tube current at the second kVp plateau during the kVp switching phase, wherein the fourth tube current is determined based on the calibration factor and the third tube current at the first kVp plateau.

The method enables accurate determination of the tube current during fast kVp switching on the time scale when reliable measurement data of the current may not (yet) be available. By way of example, at a point in time during switching before the voltage and current have stabilized on the plateau. A current measurement may be influenced by charging/discharging currents of high voltage capacities in the system during the rapid switching, whereby it takes time to reach a steady state for a sufficiently accurate measurement. E.g. a look-up-table from previous calibration runs may also not be accurate enough. The proposed method provides a solution by determining a calibration factor based on the ratio of tube currents at a first and second kVp plateau, respectively. Thanks to thermal inertia of the X-ray tube filament, the filament temperature can be regarded as constant during a fast-switching sequence between the voltage plateaus. Therefore, a relative tube current change by a tube voltage transition between two fixed voltage plateaus may also remain constant during fast switching, even with variations in the initial current from which the transition starts, such as e.g. due to drift. A calibration factor based on the ratio of currents at the two fixed voltage plateaus can be used to estimate the tube current accurately at one plateau if the current at the other plateau is known. E.g. by knowing the high emission state of the system it is possible to determine the low emission state.

In the context of the invention, the kVp switching phase comprises multiple kVp switching cycles, where each kVp switching cycle of an X-ray tube comprises two or more different kVp energy levels, also known as kVp plateaus. The two or more different kVp plateaus are different in that the plateau kVp levels are different. The kVp level (peak tube voltage) is applied across the cathode and the anode of the X-ray tube and causes a beam of the electrons to accelerate from the cathode and impinge the anode (determining the energy of generated X-rays). In an example including only two kVp levels, the kVp switching phase comprises switching the tube voltage between the first kVp plateau and the second kVp plateau. With corresponding measurement intervals (integration periods) of X-ray detection at the different kVp energy levels, this may enable X-ray spectral imaging. During a kVp switching cycle the tube voltage is switched between at least a "high" kVp energy level and a "low" kVp energy level, such that the X-ray tube generates at least two different X-ray spectra. As a non-limiting example, the generator and X-ray tube hold the cathode to anode voltage at a "low" voltage of for example 80 kV for a time period and then ramps the cathode to anode voltage from the "low" to a "high" voltage of for example 140 kV over a time period, and then holds the cathode to anode voltage at the "high" voltage for a time period, thereby forming a cycle over which dual energy X-ray are produced and providing for spectral imaging. During kVp switching, each of the time periods may be on the order of tenths to hundreds of microseconds up to several milliseconds. By way of example, a voltage transition time between kVp energy levels may be shorter than 500 μs, preferably 300 μs or shorter, or as short as a few tenths of microseconds. A time period with the voltage stable at each energy level may be less than 2 ms, preferably less than 1 ms, more preferably less than 600 μs, or even shorter. Each of the respective at least two kVp plateaus is at the same or substantially the same voltage level during both the calibration phase as during the kVp switching phase. One of the kVp plateaus is higher and the other one is lower such that dual energy X-rays can be generated. E.g. the first kVp plateau may correspond to a "low" kVp level, such as but not limited to 80 kV, and the second kVp plateau may then correspond to a "high" kVp level, such as but not limited to 140 kV. Alternatively, the first kVp plateau may correspond to a "high" kVp level, such as but not limited to 140 kV, and the second kVp plateau may then correspond to a "low" kVp level, such as but not limited to 80 kV. Although a high kVp level is exemplified throughout this application as 140 kV, it may also be higher or lower, such as e.g. 120 kV or 130 kV or 150 kV or 160 kV. Similarly, although a low kVp level is exemplified throughout this application as 80 kV, it may also be higher or lower, such as e.g. 60 kV or 70 kV or 90 kV or 100 kV.

In the context of the claimed invention, a computer-implemented method means a method which involves the use of a processor, which may include a computer, a computer network, and/or another programmable apparatus, such as a single and/or multi core processing unit, a graphics processing unit, an accelerated processing unit, a digital signal processor, a field programmable gate array, and/or an application-specific integrated circuit, etc.

According to an embodiment of the invention, the calibration phase occurs during a stabilization phase of the X-ray tube before imaging, and the kVp switching phase occurs during a spectral imaging phase. It is advantageous to determine the ratio and calibration factor during the pre-imaging stabilization phase of the X-ray tube because this phase takes place with relevant system and environmental conditions and at a timeframe during which one or several accurate calibration pulses can be provided. The stabilization phase takes place before the spectral imaging phase, during the same run of the system. As an example, the stabilization phase may be on the order of tenths of milliseconds, such as but not limited to a range between 10-60 ms, preferably 20-40 ms. An accurate calibration pulse may have combined time of slopes and the high kVp plateau on the order of milliseconds, such as but not limited to a range between 1-5 ms, preferably 1-3 ms. Herewith, an accurate calibration factor can be determined just before imaging starts. During the spectral imaging phase with repeated kVp switching, including X-ray detection at the different kVp plateaus, there may not be time within any kVp switching cycle to perform such a calibration pulse. Calibration from a different run and/or (time of) day may be sub-optimal due to changing conditions and parameters.

According to an embodiment of the invention, the method further comprises adapting the calibration factor based on additional measurements of tube currents at a steady state of the first kVp plateau and at a steady state of the second kVp plateau during the kVp switching phase. This is advantageous because it allows to monitor and if needed make further small adjustments to the calibration factor during the kVp switching phase in order to correct for drift, variations due to switching patterns etc. By comparing an instantly calculated value of e.g. a tube current at the first kVp plateau, based on a measured value at the second kVp plateau and the calibration factor, with a measured value in steady state on the first kVp plateau, the calibration factor may be iteratively adjusted and controlled without an additional calibration tube voltage pulse.

According to an embodiment of the invention, the method further comprises closed loop control of the third tube current at the first kVp plateau and/or the fourth tube current at the second kVp plateau by adapting a filament current. Closed loop control of the tube current, i.e. adjusting the actual tube current by adapting a filament current based on the determined tube current in a feedback loop, is advantageous for fast and accurate X-ray dose regulation. Such as to rapidly compensate for filament cooling effects etc. Accurate dose regulation may be relevant for image quality, patient safety etc.

According to an embodiment of the invention, the method further comprises adapting control of the X-ray tube focal spot position and/or size based on a determined X-ray tube current. By adapting the X-ray tube focal spot control and/or size to the determined X-ray tube current, contrary to a pre-determined current and/or a tube current measured in steady state, it is possible to react with focal spot control very quickly to changes in the tube current. E.g. directly after a voltage transition during the fast kVp switching cycle.

According to a second aspect of the invention, there is provided a computer program element, which, when being executed by a processor, is configured to cause a high voltage generator comprising the processor to carry out the method according to the first aspect of the invention. In one example, the computer program element is made available for downloading from a server, e.g. via the internet.

According to a further aspect of the invention, there is provided a (non-transitory) computer-readable medium having stored thereon the computer program element mentioned above.

According to a third aspect of the invention, there is provided a high voltage generator comprising a processor and configured to carry out the computer-implemented method according to the first aspect of the invention.

According to a fourth aspect of the invention, there is provided an X-ray system comprising: an X-ray tube comprising an anode, a cathode, a filament, and electron beam optics configured to regulate an electron beam focal spot size and/or position on the anode; and the high voltage generator according to the third aspect of the invention.

The high voltage generator is configured to apply a kVp switching cycle comprising at least two kVp plateaus between the anode and the cathode of the X-ray tube, and may be configured to apply a filament current over the X-ray tube filament. The high voltage generator comprises a processor.

According to an embodiment of the invention the X-ray system is a computed tomography system. The invention may be particularly advantageous for spectral computed tomography with fast kVp switching.

These and other aspects of the invention will be apparent from and elucidated with reference to the embodiments described hereinafter.

DETAILED DESCRIPTION OF EMBODIMENTS

Figure 1:
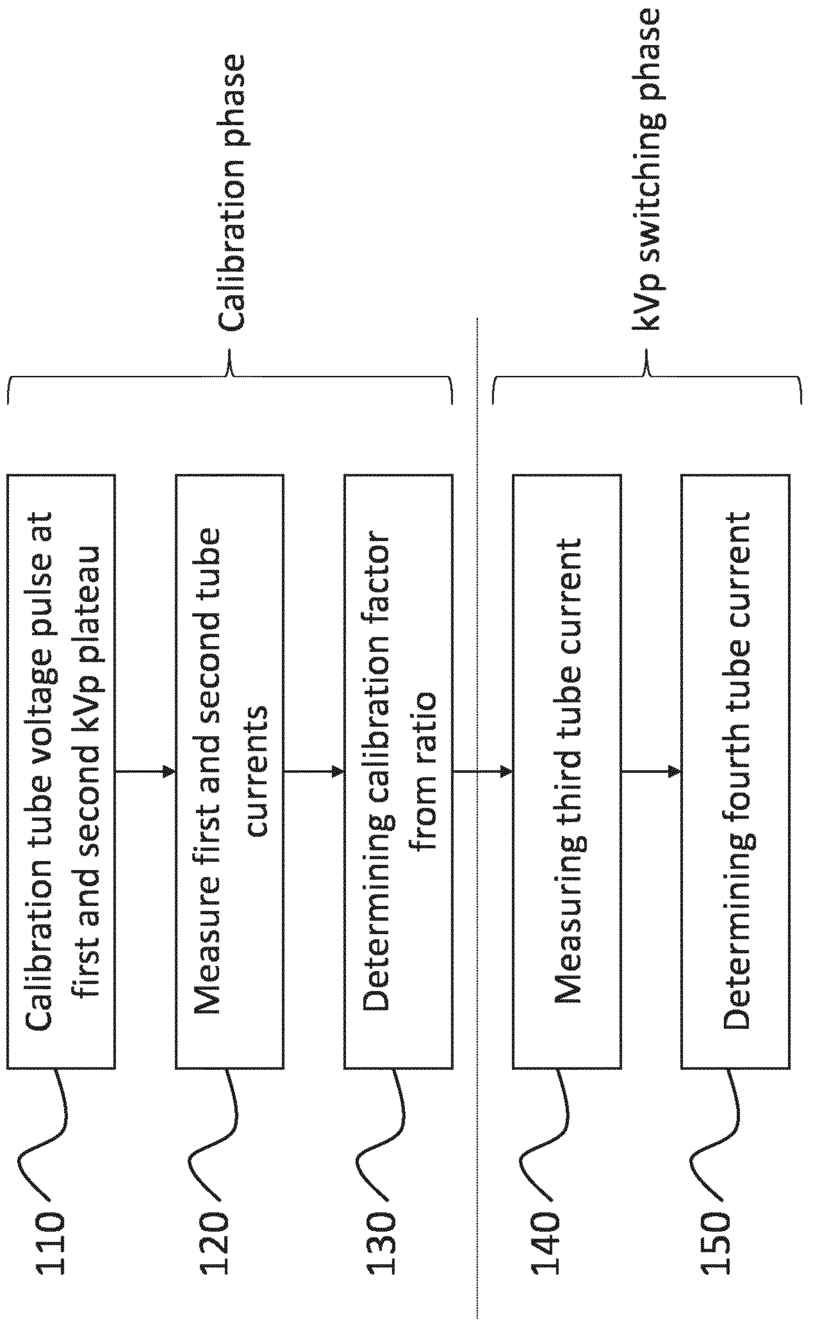
FIG. 1 schematically illustrates a method of determining an emission current according to an embodiment of the invention.

A method according to an embodiment of the invention is illustrated in FIG. 1. As shown in the figure, the method comprises the step of generating 110 a calibration X-ray tube voltage pulse, during the calibration phase. The calibration tube voltage pulse comprises a first kVp plateau and a second kVp plateau, which is different from the first kVp plateau. By way of example, the first kVp plateau may be the high plateau, such as e.g. 140 kV and the second plateau may be the low plateau, such as 80 kV. After reaching an X-ray tube emission current control steady state at 80 kV, e.g. during a stabilization time of the system, a kVp step to a first kVp plateau of e.g. 140 kV is initiated and the voltage is held at the first plateau for e.g. one or a few milliseconds. The calibration pulse is finalized by ramping down to the second plateau at 80 kV before the end of the calibration phase and if applicable the stabilization time of the system.

During the calibration tube voltage pulse, the tube current (also known as emission current) is measured 120. A first tube current is measured at the first kVp plateau and the second tube current is measured at the second kVp plateau. In this example the second emission current is measured when the emission current is steady at the second kVp plateau of 80 kV. The first emission current is measured during the one or a few milliseconds that the voltage is held at the kVp first plateau of 140 kV, and the emission current has stabilized at that level.

With both the first emission current and the second emission current measured, a calibration factor can be determined 130 from a ratio between the currents. The first emission current and the second emission current, i.e. the corresponding emission currents at 140 kV and 80 kV in this example, are thus used to determine the ratio and calibration factor applicable under the present circumstances.

During a kVp switching phase, such as during spectral imaging, a third tube current is measured 140. The third tube current is measured at the first kVp plateau, i.e. at 140 kV in this example. The third tube current is measured at the same tube voltage as the first tube current and may be similar to the first tube current. However, since emission current characteristics of the system may change over time it may not be exactly the same. Based on the third tube current and the determined calibration factor, a fourth tube current at the second kVp plateau is determined 150. In this example the tube current at 80 kV is determined based on the tube current at 140 kV and the calibration factor. In other words, the next tube current that will follow when the voltage is switched rapidly from 140 kV to 80 kV may be known by the system before it can be measured and may be used for system control.

The calibration phase as illustrated with steps 110, 120 and 130 if FIG. 1, may occur during a stabilization phase of the X-ray tube before actual spectral imaging takes place. The kVp switching phase, comprising steps 140 and 150 in FIG. 1, may occur during a spectral imaging phase. It is advantageous to determine the ratio and calibration factor during the pre-imaging stabilization phase of the X-ray tube because this phase takes place with relevant system and environmental conditions and at a timeframe during which one or several accurate calibration pulses on the order of milliseconds can be generated.

It is noted that in this and in the following examples, the first kVp plateau is chosen to be the high voltage plateau and the second kVp plateau is chosen to be the low voltage plateau. However, it is to be understood that the opposite is also possible, i.e. that the first kVp plateau is the low voltage plateau and the second kVp plateau is the high voltage plateau. In such a case, the first and the third tube currents correspond to the low kVp, such as 80 kV, and the second and fourth tube currents correspond to the high kVp, such as 140 kV.

Figure 2:
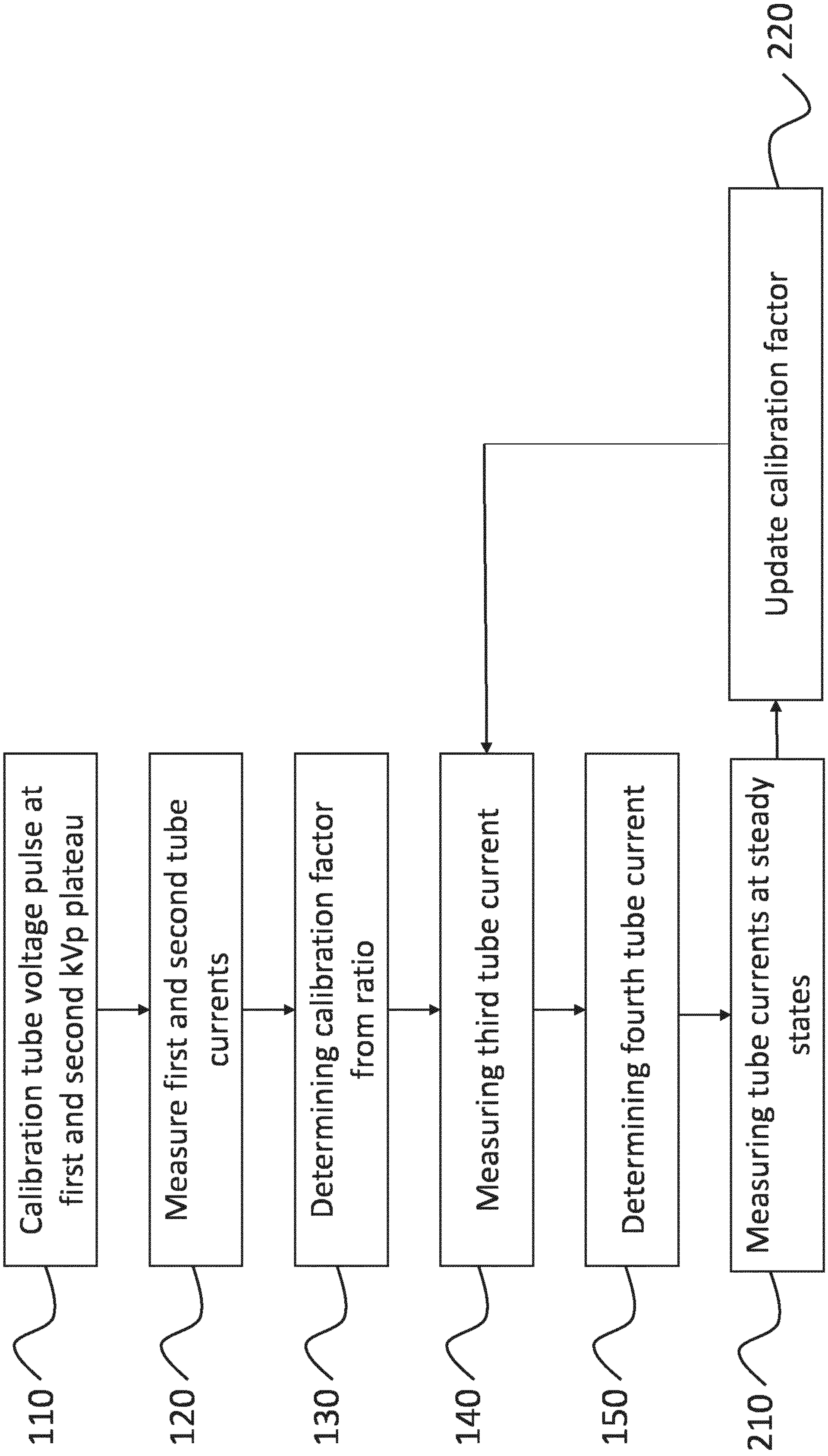
FIG. 2 schematically illustrates a method including updating of a calibration factor, according to an embodiment of the invention.

FIG. 2 illustrates the method according to an embodiment of the invention. In this case, the calibration factor may be further adapted 220, during the kVp switching phase, based on additional measurements 210 of tube currents at a steady state of the first kVp plateau and at a steady state of the second kVp plateau during the kVp switching phase. Although the time of steady state for the emission current at each plateau in the kVp switching phase is shorter than during the accurate calibration pulse, such measurements may be used to e.g. monitor and/or fine tune the calibration. A comparison between a determined expected emission current and an actual emission current as measured during steady state may be used to update and fine-tune the calibration factor. Since the determined or calculated emission current may be known already at the beginning of a plateau and the measured actual emission current may be known towards the end of the steady state, the combination of the two may provide an improved monitoring, and/or as shown in FIG. 3, control of the emission current during a large part of each switching cycle.

Figure 3:
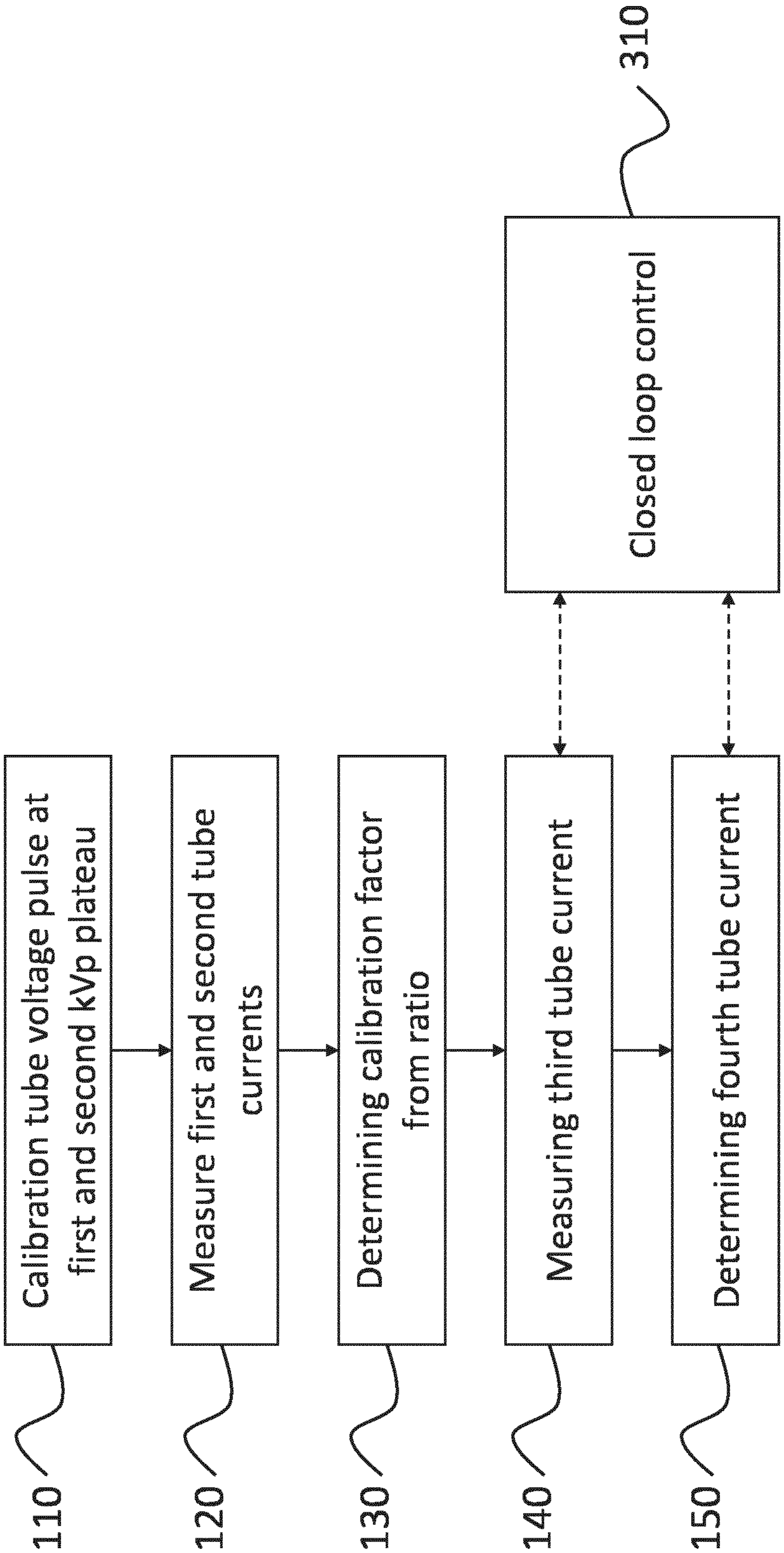
FIG. 3 schematically illustrates a method including closed loop control, according to an embodiment of the invention.

FIG. 3 illustrates the method according to an embodiment of the invention. In the example in FIG. 3, the method includes closed loop control 310 of the third tube current at the first kVp plateau and/or the fourth tube current at the second kVp plateau by adapting a filament current. Control and regulation of the X-ray tube emission current, such as for X-ray dose regulation, may be achieved by adapting the X-ray tube filament current. Fast regulation may be crucial, e.g. to compensate for effects such as but not limited to filament cooling, and/or to control the dose for the imaging application at hand. By way of example, emission current control may use the emission current at 80 kV as a reference current, I_80ref. By determining a virtual I_80ref already in a steady state at 140 kV, from the measured current at 140 kV and the calibration factor, blind spots in the emission current control during kVp switching may be avoided. I.e. a virtual I_80ref may be determined and fed to the emission current control already before a real I_80ref is available. In this way, continuous or semi-continuous emission current control may be possible without needing to wait for each steady state 80 kV phase. Once a real, measured, I_80ref is available a combined emission current feedback value may be calculated, comprising real and virtual I_80ref data, and used for the closed loop control. Alternatively, or in addition, virtual and real emission current at 140 kV may also be used as input to emission current control in a similar fashion.

Figure 4:
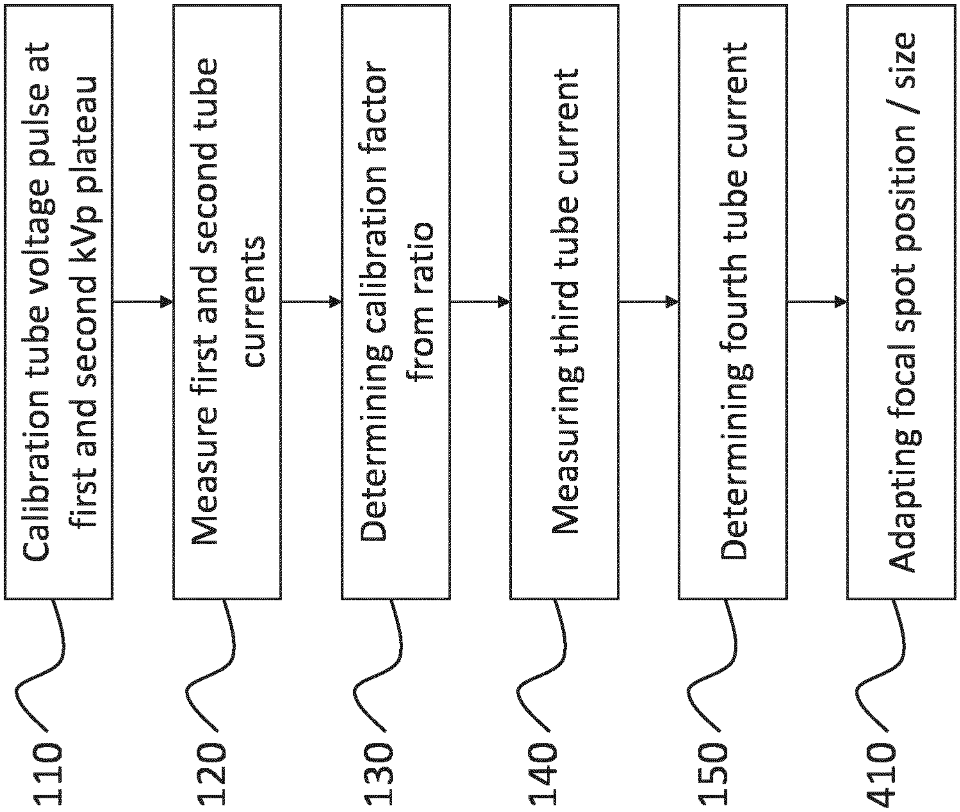
FIG. 4 schematically illustrates a method including adapting focal spot position/size, according to an embodiment of the invention.

FIG. 4 illustrates the method according to an embodiment of the invention. In this example, the method further comprises adapting control 410 of the X-ray tube focal spot position and/or size based on a determined X-ray tube current. As an example, the focal spot position and/or size may be controlled, using electron beam optics (see also FIG. 5), in relation to the emission current at one of or each of the kVp plateaus during kVp switching. In other words, the emission current at 80 kV may form input to control of the focal spot position and/or size at 80 kV. Similarly, the emission current at 140 kV may form input to control of the focal spot position and/or size at 140 kV. By using a determined, 'virtual' emission current for the focal spot control, i.e. by using a calculated emission current instead of the measured emission current at steady state, it is possible to control the focal spot position and/or size in a timely manner at the respective plateau before the measured emission current is available. By way of example, the emission current at 80 kV is determined during kVp switching based on the calibration factor and the measured emission current at 140 kV. Using this information control of the focal spot may be adapted to the determined emission current at 80 kV as soon as the voltage is switched from 140 kV to 80 kV. Before a (next) measured emission current at steady state of 80 kV is available. Once at the 80 kV plateau, a combination of the already determined current and a measured current from steady state at 80 kV may be used to fine tune the focal spot control. Similarly, by determining the emission current at 140 kV based on the current at 80 kV and the calibration factor, already before a measurement in 140 kV steady state is available, timely control of the focal spot may be enabled. By knowing the determined emission current for a next kVp plateau in advance, it may also be possible to adapt the focal spot control in advance of or during the voltage transition, e.g. to allow for time for the electron beam optics to adjust. Such as, but not limited to time required for charging magnetic focusing coils.

Figure 5:
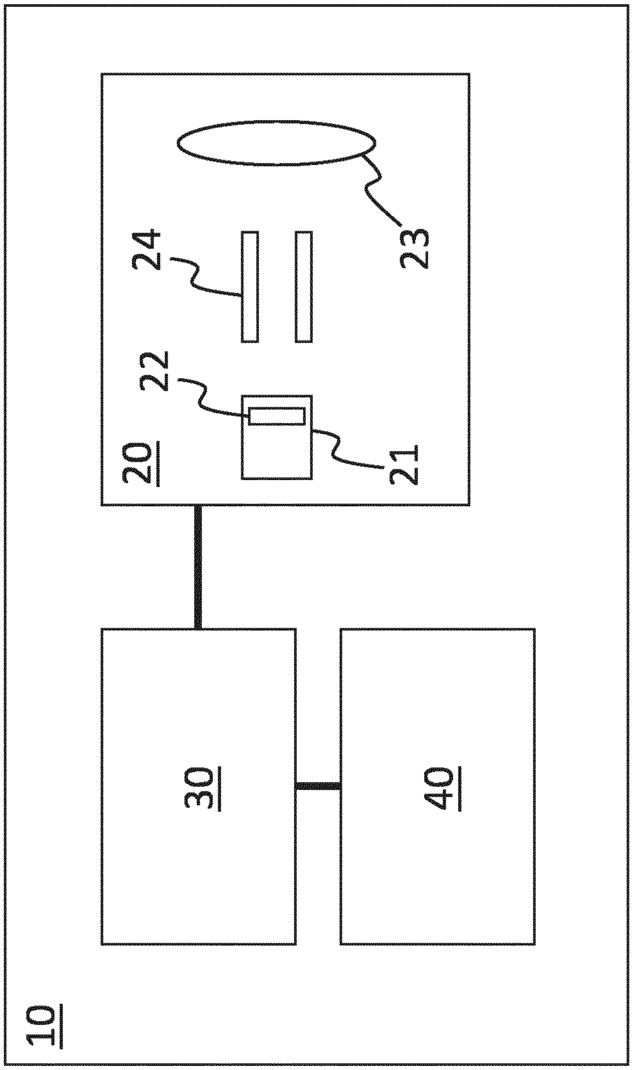
FIG. 5 schematically shows and X-ray system according to an embodiment of the invention.

FIG. 5 illustrates an X-ray system 10 according to an embodiment of the invention. The system comprises an X-ray tube 20, a high voltage generator 30 and a processor 40. The X-ray tube 20 includes a cathode 21 with a filament 22, an anode 23 and electron beam optics 24. The anode 23 may be a rotating anode. When a filament current or heating current is applied to the filament 22, heating of the filament may cause the filament 22 to expel electrons through thermionic emission. The heating current or filament current may be applied from the high voltage generator 30 and controlled via the processor 40. A peak tube voltage between the cathode 21 and the anode 23 may be applied by the high voltage generator 30 and controlled via the processor 40. The cathode 21, filament 22 and the anode 23 are in a vacuum environment. Thanks to the tube voltage, electrons that are emitted from the cathode filament 22 are accelerated to impinge the anode 23 at a focal spot such that X-ray radiation is generated. The X-ray tube current, or emission current, represents the number of electrons per second flowing from the cathode 21 to the anode 23. The spectrum of the generated X-rays depends on the energy of the electrons that impinge the anode 23 and therefore on the peak tube voltage. The high voltage generator 30 is configured to apply a kVp switching cycle comprising at least two kVp plateaus between the anode 23 and the cathode 21 of the X-ray tube 20. In this way, at least two different spectra of X-rays may be generated during such as cycle. The electron beam optics 24, inside and/or outside of the vacuum environment, regulates the size and position of the electron beam between the filament 22 and the anode 23. Thus, the electron beam optics 24 may regulate the focal spot size and/or shape and/or position. The electron beam optics 24 may be controlled by the high voltage generator 30 via the processor 40. Alternatively, the electron beam optics 24 are controlled by a separate voltage unit. The electron beam optics 24 may include e.g. quadrupoles or other means for magnetic electron beam focusing and positioning and/or grid electrodes for electrostatic focusing and positioning.

It is noted that although e.g. the high voltage generator 30 and the processor 40 are illustrated as separate blocks in FIG. 5, multiple blocks may be part of the same physical unit. As a non-limiting example, the processor 40 may be integrated with the high voltage generator 30 and comprise e.g. a digital signal processor, and/or a field programmable gate array, and/or an application-specific integrated circuit. In another example, the processor 40 is an external computer with which the high voltage generator 30 may communicate.

Figure 6:
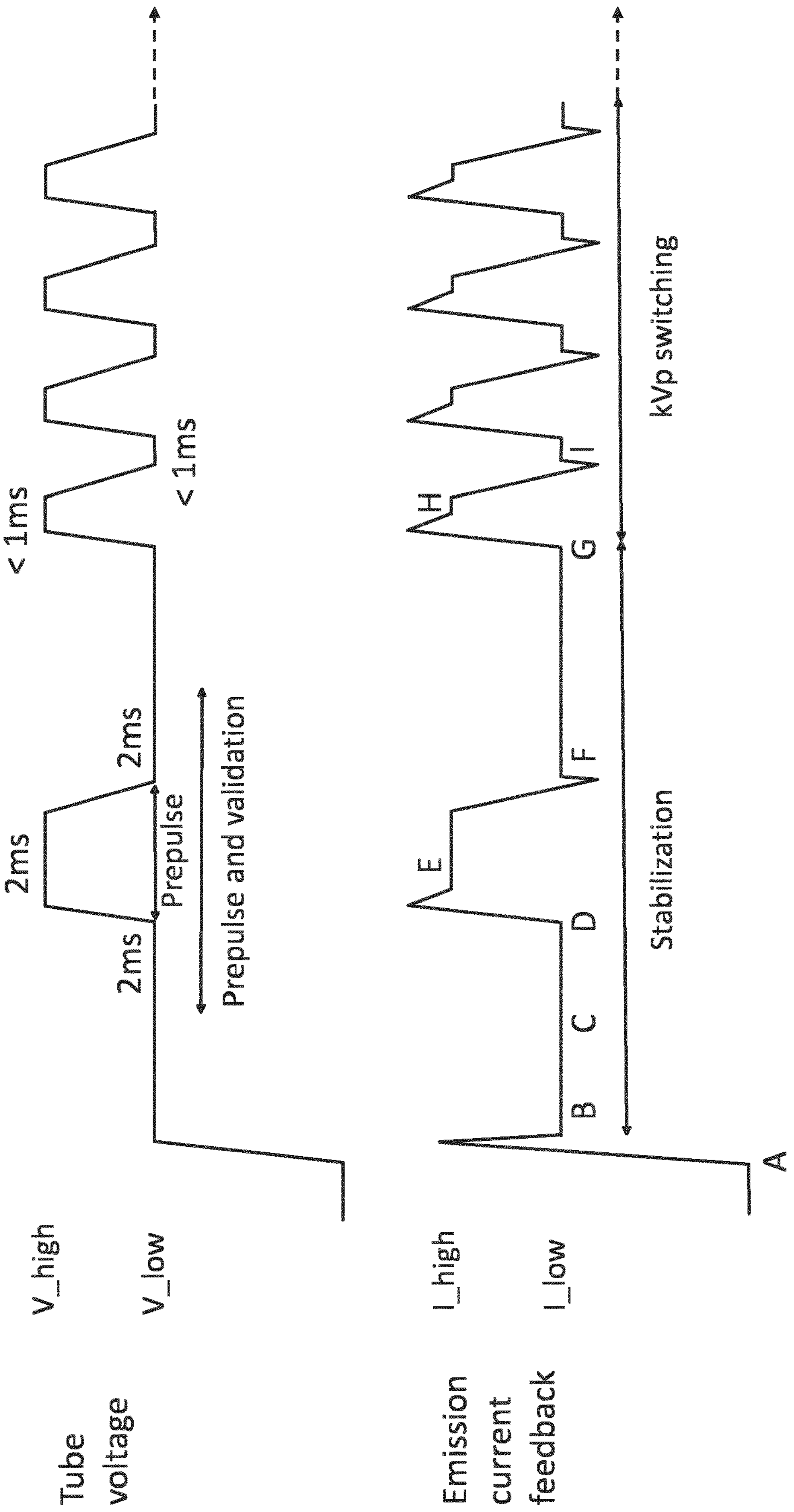
FIG. 6 schematically illustrates a timing diagram according to an embodiment of the invention.

FIG. 6 shows an example of a timing diagram for the tube voltage and emission current feedback (superimposed with charging/discharging currents), according to an embodiment of the invention. The timing is schematically illustrated during the stabilization phase before imaging and during the kVp switching phase for spectral imaging. Specifically, nine time points or markers, lettered A-I, further illustrate an example of the method:

[A]. This marker shows the start of exposure, with an open emission current control loop (such as but not limited to via feed forward control) until the tube voltage gets stabilized.

[B]. As the tube voltage has stabilized, emission current control may be enabled. Although illustrated with a simplified horizontal line in FIG. 6, the emission current may not yet have reached steady state at this point.

[C]. At this point, the emission current has reached steady state. A nominal value of an emission current I_low, corresponding to the low voltage V_low, has been reached and may be determined with accuracy.

[D]. Start of a voltage pre-pulse, such as a high charging pulse followed by a plateau phase (steady state) at the high voltage level V_high.

[E]. Here, a steady state plateau is reached for both voltage and emission current I_high corresponding to the high voltage V_high. The plateau may be e.g. 2 ms but may also be longer or shorter as long as a sufficiently accurate determination of the emission current is achieved. At this point, the emission current controller may be disabled, and the filament current may be kept constant. Due to the high thermal time constant, the filament temperature is considered to be constant during the pulse.

[F]. When the pre-pulse is finished and the voltage is back at V_low, the emission current may be measured again with accuracy during a time period of e.g. 2 ms. Before enabling emission current control, the actual emission current value can be compared with the nominal value in order to validate the assumption of constant filament temperature. If the actual value before and after the pre-pulse is the same, the filament temperature has not changed during the pre-pulse. A calibration factor based on the ratio between I_high and I_low may be calculated.

[G]. The kVp switching phase starts. Generally, the kVp switching cycles include shorter high and low kVp plateaus compared to the pre-pulse.

[H], [I]. During the kVp switching phase, the most recent I_high can be determined based on the calibration factor and the most recent I_low, and vice versa. At the high and/or low plateau, the emission current can be determined before the most recent measurement is available. Although the time of steady state for the emission current at each plateau in the kVp switching phase is shorter than during the accurate pre-pulse, such measurements may be used to e.g. monitor and/or fine tune the calibration over time. A comparison between a determined expected emission current and an actual emission current as measured during steady state ([H], [I]) may be used to update and fine-tune the calibration factor. Since the determined or calculated emission current may be known already at the beginning of a plateau and the measured actual emission current may be known towards the end of the steady state, the combination of the two may provide an improved monitoring. Furthermore, as exemplified in FIG. 3 and FIG. 4, the determined emission currents may be used for closed loop control of the filament current and/or to adapt the focal spot control in a timely manner.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. Measures recited in mutually different dependent claims may advantageously be used in combination.

The invention claimed is:

1. A computer-implemented method of determining a tube current during X-ray kVp switching, the method comprising:

generating a calibration tube voltage pulse during a calibration phase, wherein the calibration tube voltage pulse comprises a first kVp plateau and a second kVp plateau, wherein the second kVp plateau is at a different kVp level compared to the first kVp plateau;

measuring, during the calibration tube voltage pulse, a first tube current at the first kVp plateau and a second tube current at the second kVp plateau;

determining a calibration factor from a ratio between the first tube current and the second tube current;

measuring a third tube current at a steady state of the first kVp plateau during a kVp switching phase;

determining a fourth tube current at the second kVp plateau during the kVp switching phase, wherein the fourth tube current is determined based on the calibration factor and the third tube current at the first kVp plateau.

2. The method according to claim 1, wherein the calibration phase occurs during a stabilization phase of the X-ray tube before imaging, and wherein the kVp switching phase occurs during a spectral imaging phase.

3. The method according to claim 1, wherein the method further comprises adapting the calibration factor based on additional measurements of tube currents at a steady state of the first kVp plateau and at a steady state of the second kVp plateau during the kVp switching phase.

4. The method according to claim 1, wherein the method further comprises closed loop control of the third tube current at the first kVp plateau and/or the fourth tube current at the second kVp plateau by adapting a filament current.

5. The method according to claim 1, wherein the method further comprises adapting control of the X-ray tube focal spot position and/or size based on a determined X-ray tube current.

6. A high voltage generator comprising a processor, wherein the high voltage generator is configured to carry out the computer-implemented method according to claim 1.

7. An X-ray system comprising:

an X-ray tube comprising an anode, a cathode, a filament, and electron beam optics configured to regulate an electron beam focal spot size and/or position on the anode; and the high voltage generator according to claim 6.

8. The system according to claim 7, wherein the system is a computed tomography system.

* * * * *